United States Patent
Johnson

[19]

[11] Patent Number: 5,876,160
[45] Date of Patent: Mar. 2, 1999

[54] MILLING WITH INSERT HAVING CUTTING-EDGE LAND OF WIDTH INCREASING WITH DEPTH OF CUT

[75] Inventor: William B. Johnson, Rockford, Ill.

[73] Assignee: Ingersoll Cutting Tool Company, Rockford, Ill.

[21] Appl. No.: 701,087

[22] Filed: Aug. 21, 1996

[51] Int. Cl.$^6$ ...................................................... B23C 5/02
[52] U.S. Cl. ............................. 409/132; 407/113; 407/42
[58] Field of Search ............................. 407/42, 113, 34, 407/53, 61, 115; 409/132

[56] References Cited

U.S. PATENT DOCUMENTS

| | | |
|---|---|---|
| 3,786,541 | 1/1974 | Lundgren . |
| 3,882,580 | 5/1975 | Lundgren . |
| 5,032,049 | 7/1991 | Hessman et al. . |
| 5,078,550 | 1/1992 | Satran et al. ................................ 407/34 |
| 5,199,827 | 4/1993 | Pantzar . |
| 5,244,318 | 9/1993 | Arae et al. ................................ 407/42 |
| 5,544,984 | 8/1996 | Pantzar ................................ 407/113 |

*Primary Examiner*—Daniel W. Howell
*Assistant Examiner*—Mark Williams
*Attorney, Agent, or Firm*—Fitch, Even, Tabin & Flannery

[57] ABSTRACT

The cutting inserts of this patent are provided with positive cutting geometry and are especially adapted for service in face milling and shoulder milling raw castings and other hard-shelled workpieces by providing a cutting edge land which varies in width along the cut from narrowest at the bottom of the main cutting edge to broadest where the cutting edge meets the hard surface of the workpiece. In double-ended cutting edges, i.e., where the cutting edge is designed to cut equally in cutters of either hand of rotation, the maximum land width occurs at cutting edge midpoint and tapers to minimum width at each end. The surface of the land may also desirably be warped, twisting from radially positive rake at the bottom of the main cutting edge to neutral or even negative radial rake where the cutting edge meets the hard surface of the workpiece.

13 Claims, 3 Drawing Sheets

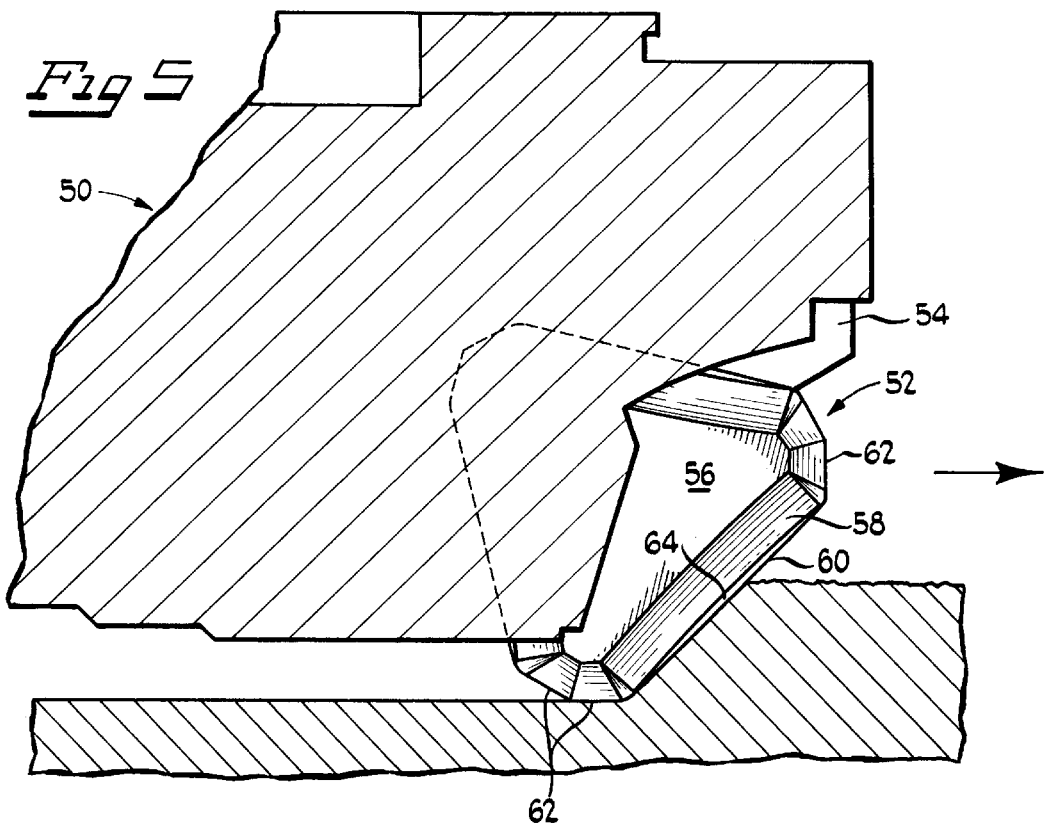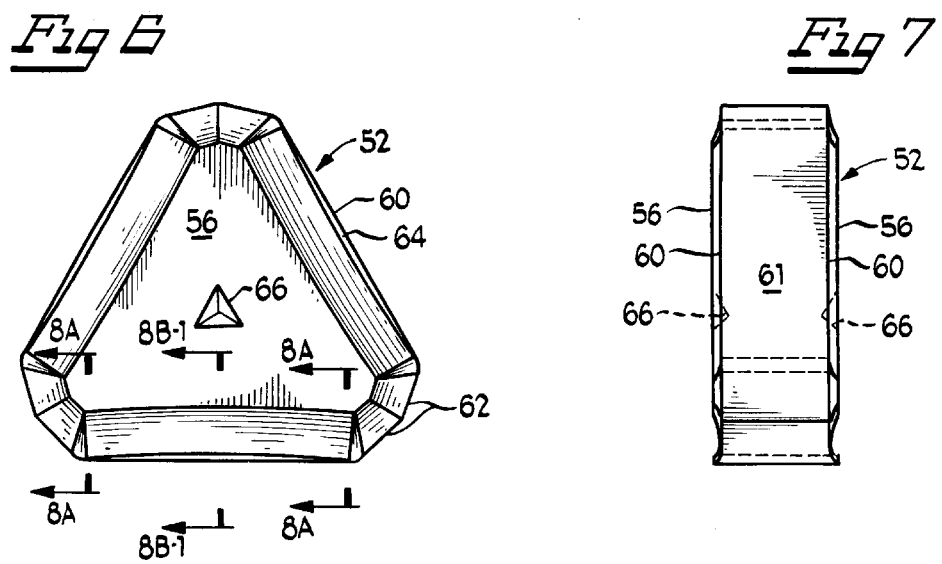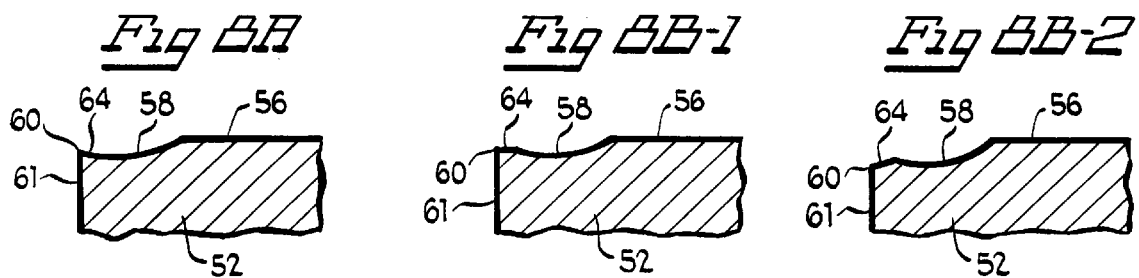

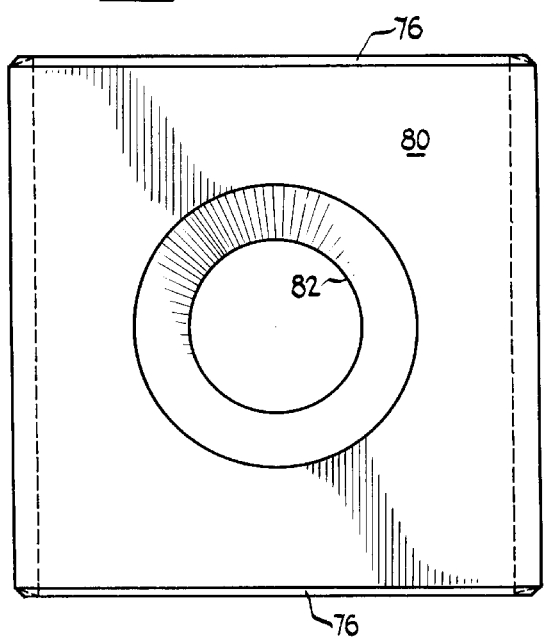
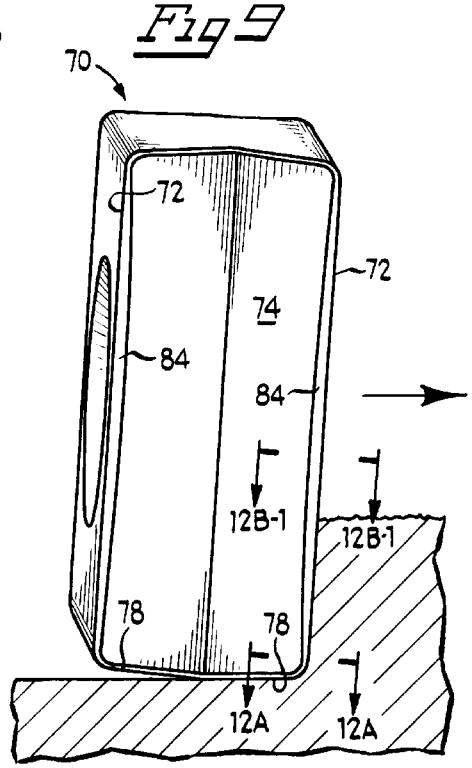
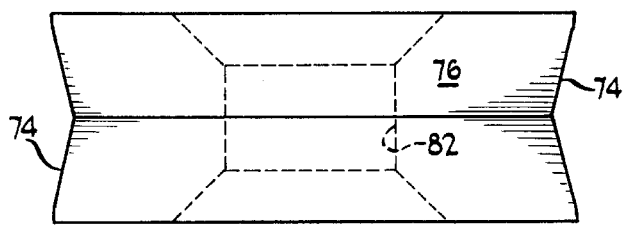
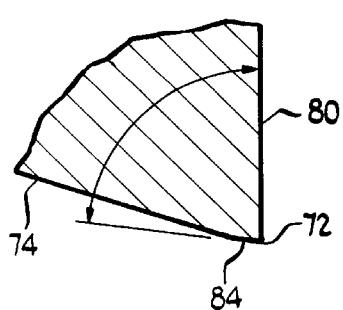 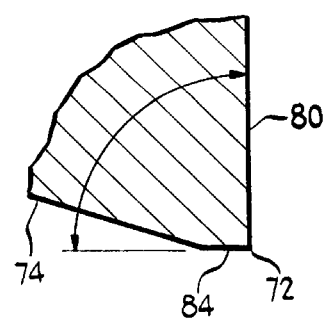 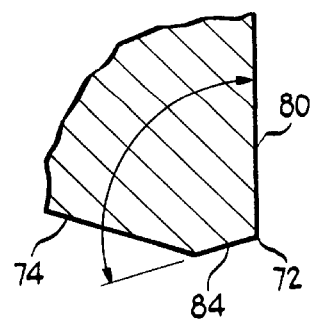

MILLING WITH INSERT HAVING CUTTING-EDGE LAND OF WIDTH INCREASING WITH DEPTH OF CUT

This invention relates to metal cutting, and more particularly to the face milling and shoulder milling of previously uncut castings and other work pieces which present similar characteristics.

BACKGROUND OF THE INVENTION

The first face milling cut of raw castings is a challenge because the outer shell of the casting is hard and frequently carries embedded moulding sand which abrades the cutting edges and rake faces of the milling cutters. The problem is further accentuated in the milling of cast iron engine blocks, where efforts at weight reduction and engine-cooling efficiency have reduced wall-thicknesses to a minimum. To mill gasket surfaces on such complex parts and thin sections without significant break out where the cutting tool exits the cut typically requires sharper cutting edges, i.e., a relatively high degree of positive rake, which, in turn, weakens the cutting edge and renders it more vulnerable to the accelerated and selective dulling action encountered by that portion of the cutting edge in constant edgewise encounter with the harder and abrasive skin of the casting while in the cut. Chipping of the cutting edge at that depth is not uncommon.

The resulting loss of the preferred cutting geometry shortens the useful life of the tool, and results in substantially increased cutting loads. These in turn increase the workpiece deflection, reducing the accuracy of the machining operation. If not adequately monitored, the condition will cause excessive breakout at the exiting edge of the cut, and require scrapping of the workpiece.

This real problem is addressed by this invention by providing a progressively strengthened cutting edge along the depth of the cut, i.e., by the provision of a cutting edge land which increases progressively in width from the bottom corner of the positive rake face upwardly along the cutting edge to the full height of cut for which the insert is designed. By that measure, the cutting edge is strengthened where it encounters the hardened and abrasive skin of the raw casting while preserving the downwardly increasingly sharper edge for the heavier metal removal load beneath the outer skin of the casting to the full depth of cut.

The hardened skin condition which characterizes previously uncut cast iron occurs in other materials as well. Forged steel, for example, and hot-rolled slab typically incorporate a harder skin layer from the working of the material, while certain metals exhibit surface hardening merely from previous machining cuts. For such applications as well, although less often encountered, perhaps, than the machining of raw castings, the wider cutting edge land at the top of the milling cut is preferred to offset the greater wear experienced at that location.

PRIOR ART

Varying width of cutting edge land is not unknown in the metal cutting art, and, in fact, a varying land width having some of the aspects of the milling tool of this invention has been employed, although with different purpose and to different effect, in metal turning. Reference is made to U.S. Pat. Nos. 3,786,541 and 3,882,580, both of the same inventor, and owned by the worldwide Sandvik Company. In the former, a narrow corner land which widens away from the corner is shown in FIG. 25 without attribution of purpose in the associated text. From the latter patent, however, it appears that the purpose is to protect the wider-land portion of the cutting edge, when not in the cut, from the erosive abrasion of the ductile metal chip curling back over the cutting insert from the narrow-land nose portion of the insert that is doing the cutting. Compare FIGS. 4 and 5 with FIG. 1.

However, to the extent that the problem of selective cutting-edge wear experienced in milling hard-shell materials has been recognized, it has heretofore been addressed by cutting edge treatment which is opposite to that which characterizes the present invention. In U.S. Pat. No. 5,032,049, also assigned to Sandvik AB, cutting inserts designed specifically for the face milling of cast iron engine blocks are provided with cutting edge lands which are wider in the lower corner of the rake face, where, according to this patent, the largest cutting forces arise, and become progressively narrower up through the height of the cut (FIG. 8), being narrowest at the uncut surface of the workpiece. That same inverse relationship of cutting edge land widths is also advocated by Sandvik U.S. Pat. No. 5,199,827 for endmill use, i.e., for 90° shoulder milling (FIG. 2A), wherein the widest portion of the progressively varying cutting-edge land occurs at the bottom of the cut rather than at the level of the uncut surface of the workpiece.

SUMMARY OF THE INVENTION

Based upon experience in the described milling service, this invention finds it more efficient in tool life and milling service of the kind earlier described to increase the width of the cutting edge land in the cut from narrowest at the lower corner of the rake face, i.e., at the bottom of the cut, to widest at the surface of the workpiece, both for face milling and for shoulder milling applications. In one preferred form, the surface of the cutting edge land twists from radially positive at the bottom of the cut to neutral or negative at the surface of the workpiece.

DESCRIPTION OF THE DRAWINGS

The invention is explained in reference to the accompanying drawings which illustrate the invention in its application to three different face mills, two of substantial lead angle and one adapted for shoulder milling.

FIG. 5 is a partial sectional view of a right-hand face mill also having a 45° lead but having triangular, wafer-like inserts of radial or near-radial orientation and six cutting edges modified in accordance with the invention, and usable in cutters of either right-hand or left-hand rotation.

FIG. 6 is a frontal elevation of the insert of FIG. 5.

FIG. 7 is a side or end elevation of the same; and

FIGS. 8A, 8B-1, and 8B-2 are enlarged partial sectional views of the insert of FIG. 6 taken respectively on the lines 8A—8A and 8B—8B of FIG. 6, FIGS. 8B-1 and 8B-2 illustrating alternative conditions at the indicated section line.

FIG. 9 is a front elevation of an on-edge cutting insert modified in accordance with the invention, and removed from its cutter body but positioned as though held in a right-hand cutter of negligible positive lead while sweeping through the cut.

FIG. 10 is a side elevation of the insert of FIG. 9.

FIG. 11 is a top view of the insert of FIGS. 9 and 10; and

FIGS. 12A, 12B-1, and 12B-2 are enlarged partial sectional views of the main cutting edge of the insert of FIG. 9 taken respectively on the lines 12A—12A and 12B—12B of FIG. 9, FIGS. 12B-1 and 12B-2 illustrating alternative conditions at the indicated section line.

DESCRIPTION OF PREFERRED EMBODIMENTS

Figure 1:
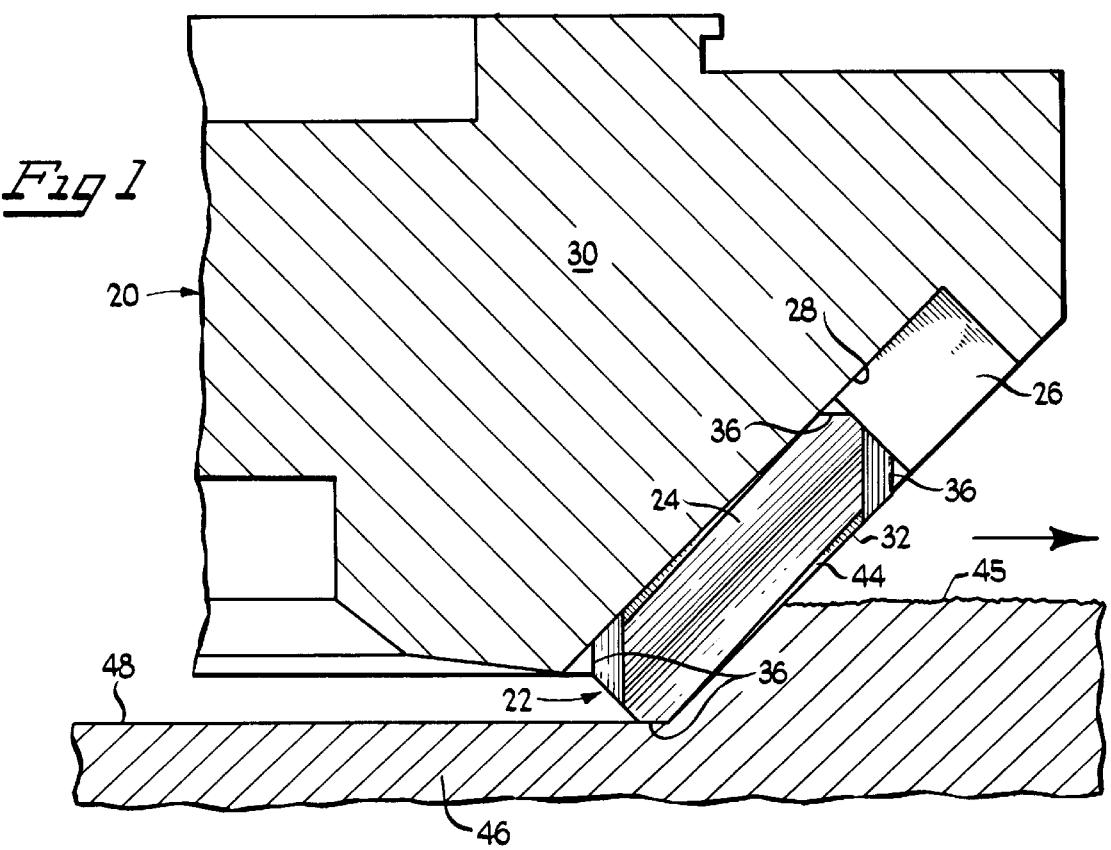
FIG. 1 is a partial sectional view of a right-hand face mill having a 45° lead and tangential or "on-edge" cutting inserts modified in accordance with the invention.

The face mill 20 shown in FIG. 1 is a heavy duty right-hand milling cutter (rotation clockwise when viewed from behind the spindle) equipped with multiple "on-edge" or tangentially disposed cutting inserts of which only the leading insert 22 in the cut is shown. The feed direction of the cutter is indicated by the arrow pointing right in FIG. 1, and the chip being removed has been omitted for a clear view of the rake face 24. That insert, because of the inverted V-shaped configuration of its opposed rake faces 24, abuts the conforming face (not shown) of an L-shaped insert nest 26. The interfitted insert 22 and nest 26 are each secured separately in a pocket 28 milled in the body 30 of the cutter, by means of a customary countersink head retaining screw (not shown) passing through countersunk holes in the insert 22 and in its nest 26, and into tapped holes in the cutter body 30.

The holding screw and tapped receiving hole arrangement are preferably the bent screw biasing arrangement of U.S. Pat. No. 3,662,444-Erkfritz.

Figure 2:
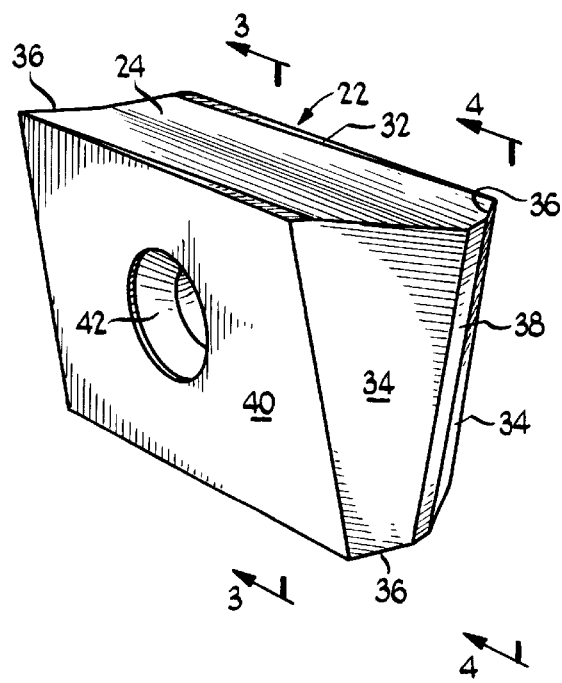
FIG. 2 is an enlarged perspective view of the insert alone of FIG. 1.
Figure 3:
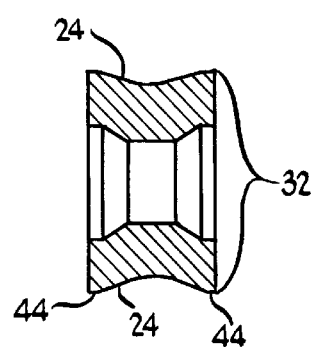
FIG. 3 is a sectional view of the insert taken on the line 3—3 of FIG. 2.
Figure 4:
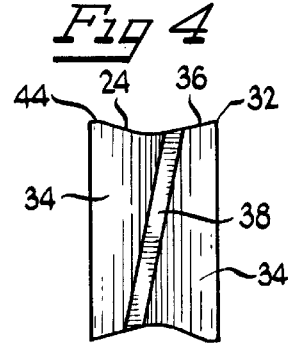
FIG. 4 is an end view of the insert of FIG. 2.

The insert 22 chosen to illustrate the invention in FIGS. 1 to 4 is a more recent version of the face-milling insert of FIGS. 1 and 2 of U.S. Pat. No. 3,694,876, being modified from the several embodiments of the 1972 patent by the employment of a single central longitudinal V-shaped groove in each rake face to render the cutting geometry of the longitudinal cutting edges positive, and by other modifications to adapt it to the present invention.

Each insert 22 is thus an elongated generally rectangular block of hard metal, such as tungsten carbide, which, as noted, is V-grooved longitudinally along the centerline of each rake face 24 to render each longitudinal half of the rake face positive, and thus to sharpen each of the flanking longitudinal cutting edges 32.

The ends of the insert are multi-faceted, each having two identical but relatively inverted trapezoidal plane surfaces 34 which serve respectively as clearance surfaces behind a wiping edge 36 at the intersection of the narrow end of the clearance surface with the rake face of the insert.

Between the two trapezoidal surfaces 34 at each end of the insert is a narrow, plane, diagonal surface 38 perpendicular to the parallel side surfaces of the insert, the same providing a seating surface at the end of the insert opposite the wiping end actively engaged in the cut. One of the parallel side surfaces 40 provides the inwardly facing major seating surface of the insert while the opposite outwardly facing parallel surface is the clearance face behind the active major cutting edge 32 of the insert. The usual countersunk hole 42 for a retaining screw passes through the insert between the parallel side surfaces 40, centered between the parallel major cutting edges 32 of each surface 40, as well as between the narrow diagonal seating surfaces 38 at each end of the insert.

The arrangement thus provides, in combination, four main metal-removal cutting edges 32 each with an accompanying, surface-planing wiping edge 36, all of the same hand of rotation, right-hand as illustrated. When intended for left-hand rotation, the trapezoidal surfaces 34 are reversed, i.e., in end view the narrow diagonal seating surface 38 would extend diagonally upwardly to the left, rather than upwardly to the right as shown.

In accordance with the invention, each of the main cutting edges 32 is blunted with a narrow land 44 which has negligible width at its juncture with the cooperating wiping edge 36, and increases in width to a maximum at the opposite end of the insert 22, presenting a long, very narrow surface with nonparallel sides which may define a thin triangle, or thin trapezoid, depending upon the width of the land at the lower extremity of the major cutting edge 32.

Referring to FIG. 1, it will be seen that the object is to increase the width of the cutting edge land 44 upwardly through the cut being taken, so that the greatest width of the cutting land actually in the cut is presented to surface of the workpiece 46, and the narrowest width of cutting land 44 is presented at the bottom of the cut.

This inverse relationship of cutting-edge land widths serves the two-fold purpose of strengthening that portion of the main cutting edge 32 that must deal with the hardened scale- or sand-encrusted outer skin 45 of the workpiece 46 on the roughing cut, while presenting an increasingly sharper main cutting edge 32 down through the cut and along the wiping edge 36 to reduce the local stress within the workpiece downwardly along the cut, and thus to reduce the incidence of breakout at the edges of the milled surface 48 where the cutter exits the cut.

This inverse relationship, as pointed out in the introductory discussion of the prior art, contradicts heretofore conventional wisdom which favored the reverse relationship of cutting land width, i.e., the broadening of the cutting-edge land at the juncture of the main cutting edge with the wiping edge, upon the stated assumption that the greatest cutting force reactions were experienced at that juncture. This invention proceeds, rather and conversely, upon the basis that the cutting force reactions along the main cutting edge at and near its juncture with the wiping edge are reduced by the sharper cutting edge, at any given speed and feed rate, to the benefit of the cutter-exiting edges of the machined surface, while the upwardly widening cutting edge land extends the useful life of the main cutting edge where it meets the encrusted and hardened skin of the workpiece.

In the form of the relatively massive insert of FIGS. 1 to 4, the widening of the land of the main cutting edge continues more or less uniformly to the end opposite the associated wiping edge, enabling the insert to cut to substantial depths, given the single-handedness of the cutting edge. However, where cutters of opposite hand can be paired or employed in combinations of left-hand and right-hand rotations, the invention may similarly be employed to increase the width of the land of the main cutting edge from negligible at its juncture with the wiping edge to a maximum midway along the cutting edge, and then to taper down to negligible width at the opposite end of the cutting edge. Such is the plan of the two further modifications illustrated in FIGS. 5 to 8, inclusive, and FIGS. 9 to 12, respectively.

Referring to the modification of FIGS. 5 to 8, inclusive, the milling cutter 50 illustrated is fitted with multiple triangular cutting inserts 52 of wafer type, each oriented with its larger dimension disposed generally radially of the cutter body 50, as distinguished from tangentially, and locked in a receiving pocket 54 of the cutter body by a locking wedge in the manner well-known in the art, and not illustrated as such in FIG. 5.

The cutter is shown as a right-hand cutter and the rake faces 56 of the insert are rendered positive adjacent the cutting edges by peripheral grooving 58 of the rake faces, namely, both major and parallel faces thereof, as shown in FIGS. 6 and 7.

From the orientation of the insert in the cutter body, it will be seen that each side of the triangular rake faces 56 provides three main cutting edges 60 each having an adjoining wiping edge 62 disposed at a 45° exterior angle with respect thereto, the particular insert illustrated being intended for a cutter with a lead angle of 45 degrees.

Moreover, as both faces 56 of the insert are identical, the insert is indexable to provide a total of twelve cutting edges 60, six of either hand. Such versatility is obviously achieved at the expense of depth of cut as a trade off.

Given, however, that each side of the triangle provides a main cutting edge 60 and associated wiper 62 at both ends of the main cutting edge, the cutting edge land 64 provided is widest at the center of each main cutting edge 60 and narrows down in both directions to negligible land width at its juncture with the wiping edge 62 at each end.

This is accomplished by bowing the sharpening groove 58 inwardly toward the center of the triangular face 56. Actually, the design intention is that the longitudinal axis of each chip groove be divided into two angularly disposed straight-line sections, but in execution, i.e., in the pressing and subsequent sintering of the carbide, that detail is not readily seen and the resulting groove appears as a slightly bowed curve.

From FIG. 7, however, it will be noticed that each main cutting edge 60 is a straight line throughout both its right-hand and left-hand cutting portions (halves), and that the main cutting edges are recessed slightly from, but remain parallel to, the plane of the adjacent triangular face 56.

While the relative widths of land are slightly exaggerated in FIGS. 5 and 6 for illustrative purposes, the preferred width of land midway along a main cutting edge (FIG. 8A) is approximately 0.011 inches, and at its juncture with the wiping edge (FIG. 8B) narrows to a width of approximately 0.005 inches, a reduction of approximately two to one, which in some applications may desirably be raised to three to one, either by a further narrowing of the narrow land portion or a broadening of the wider portion.

Moreover, for some applications the inclination of the cutting edge land 64 relative to the side edge clearance surface 61 also changes throughout the depth of cut, as shown in FIGS. 8A and 8B. That is, the cutting edge land takes the form of a warped surface, twisting from radially positive at each narrow end of the land to radially neutral or negative at maximum depth of cut, i.e., where the cutting edge land meets the hardened crust of the workpiece. These conditions are shown in the cross-sectional views of FIGS. 8A, 8B-1, and 8B-2, the latter two showing the alternatives of neutral and negative rake. More specifically, in reference to the surfaces of the insert itself, the cutting edge land 64 at its narrowest, i.e., at both ends, makes an acute angle with the side edge clearance surface 61, which becomes progressively less acute, being either a right angle or obtuse at its widest, central portion.

The tetrahedral dimple 66 in each triangular face 56 of the insert provides a gripping reference for grinding the narrow edge surfaces of the insert.

The modification of FIGS. 9 to 12, inclusive, is an on-edge or tangentially-oriented insert 70 designed for face milling to a shoulder. For that purpose, and to provide two cutting edges 72 of either hand of rotation at each rake face 74, the insert is relatively elongated in the axial direction of the cutter, the body of which is not shown in FIG. 9 to permit a more complete depiction of the insert in its cutting relationship to the workpiece while executing a cut with right-hand rotation of the cutter.

It will be noted that the insert 70 is modestly gabled on its top and bottom surfaces 76 to provide each rake face with distinct wiping or planing edges 78 in both cutting directions, and at equal angles to their associated main cutting edges 72. This then is accommodated by a slight but acceptable outward tilt of the main cutting edge 72 from parallelism with the rotational axis of the cutter. In addition, the insert is tilted forwardly to provide heeling clearance behind the active wiping edge 78, and rotated inwardly about its active main cutting edge 72 to depress the trailing edge of the insert radially inwardly from the cutting path for clearance behind the main cutting edge.

The rake faces 74 at opposite ends of the insert 70 are grooved in shallow V-shaped crosssectional configuration, symmetrically oriented between the two parallel side surfaces 80 of the insert, which also provide the main seating surface of the insert against the back of an insert pocket of the cutter body, absent in FIG. 9. The usual double countersunk hole 82 passes through the insert between its side surfaces, which are alternately the seating and side clearance surfaces as the insert is indexed by rotation about its screw-hole axis and perpendicularly thereto, in turn, to utilize seriatim all four available cutting edges 72 of either hand of rotation.

As shown particularly in FIG. 9, the main cutting edge 72 along each rake face is provided with a land 84 of varying width, narrow at the bottom of the cut, where it adjoins the wiping edge 78 in a smooth curve, and widening progressively upwardly to the center, with widths and ratios comparable to those stated in detail for the modification of FIGS. 5 to 8, inclusive.

Moreover, as shown by the cross-sectional detail of FIGS. 12A, 12B-1, and 12B-2, comparable to FIGS. 8A, 8B-1, and 8B-2, the surface of the land is warped, twisting as it widens on its upward rise along the cutting edge 72. At the bottom of the cutting edge, adjoining the wiping edge 78, the land 84 preferably makes a slightly acute angle with the adjacent clearance surface 80. At the midpoint of the cutting edge 72, the angle made by the twisting land with the clearance surface is increased either to a full right angle, as in FIG. 12B-1, or, for some applications, may be increased to an obtuse angle, as shown in FIG. 12B-2. The latter finds application where the hardness gradient along the depth of the cut is abrupt or severe.

The V-shaped configuration of the rake faces 74, incorporated to render the cutting geometry radially positive, may be performed by grinding but is preferably pressed into the "green" carbide before sintering. In that way, the broadening and twisting of the cutting edge land can be realized while preserving a straight-line main cutting edge 72 where required.

In all three illustrative forms of cutting insert according to the invention, the object is to preserve the full advantage of the positive geometry at the bottom of the main cutting edge to minimize the cutting force reaction at that depth while preparing for the greater reaction forces encountered at the hard-shell surface of the workpiece when face milling in the described service. The ultimate aim is to minimize breakout of the milled surface where the cutting insert passes out of the cut, while extending the life of the insert by eliminating chipping of the cutting edge where it encounters the hard shell of the workpiece, and to do so at the metal removal rates demanded by current repetitive production milling operations.

The features of the invention believed patentable are set forth in the following claims.

What is claimed is:

1. A milling cutter for milling iron castings and materials having a hard outer skin;

said cutter having multiple cutting edges sweeping a common cutting path about the axis of the cutter while being fed into a workpiece laterally of said axis at a given depth of cut;

each said cutting edge being disposed along a rake face having positive radial rake and being blunted by a land;

said land increasing progressively in width along said depth of cut from a minimum at the bottom of the cut to a maximum where said edge meets said outer skin.

2. The cutter of claim 1 wherein said cutting edge land is a warped surface twisting along the depth of cut, said land surface having a radial rake which is progressively less positive as said land width progresses from said minimum to said maximum width.

3. The cutter of claim 2 wherein said rake of said land surface is neutral at said maximum width.

4. The cutter of claim 2 wherein said rake of said land surface is negative at said maximum width.

5. A milling insert for milling iron castings and materials having a hard outer skin;

said insert having a rake surface and a side clearance surface intersecting at an acute angle to form a main cutting edge along one side of said rake surface;

said insert having a bottom clearance surface adjoining said side clearance surface and intersecting said rake surface in a wiping edge at the bottom of said main cutting edge;

said main cutting edge being blunted by a land which increases in width along the depth of cut from a minimum at the bottom of said cutting edge to a maximum where said cutting edge meets said outer skin.

6. The milling insert of claim 5 wherein the side cutting edge meets the wiping edge in a smooth curve reflected in the workpiece when a milling cutter employing such insert is used to mill a shoulder.

7. The milling insert of claim 5 wherein said cutting edge land is a warped surface twisting along the depth of cut, and making an angle with said side clearance surface which is acute at the bottom of said main cutting edge and less acute where said cutting edge meets said outer skin.

8. The milling insert of claim 7 wherein the warped surface of said land makes a right angle with said side clearance surface at maximum width of said land.

9. The milling insert of claim 7 wherein the warped surface of said land makes an obtuse angle with said side clearance surface at maximum width of said land.

10. The milling insert of claim 5 wherein said maximum width occurs at the midpoint of said cutting edge and said cutting edge land narrows in both directions from said midpoint to junctions with wiping edges having identical angularity with said cutting edge;

said cutting edge land being a warped surface twisting from an acute angle with said side clearance surface at opposite ends of said cutting edge where said land is narrowest to an obtuse angle therewith at the midpoint of said cutting edge where said land is widest;

said cutting edge land being symmetrical about the midpoint of said cutting edge and providing identical cutting edge geometry for cutters of either hand of rotation.

11. The method of face milling iron castings and materials having a hard outer skin, which comprises:

employing a face milling cutter having multiple cutting inserts sweeping a common cutting path;

feeding said cutter into the workpiece at a cutting depth sufficient to encounter a gradient of material hardness increasing from the bottom of the cut upwardly to said hard outer skin;

said inserts being formed to provide a rake face and a side clearance surface making an acute angle with the rake face to provide a main cutting edge;

said inserts having a bottom clearance surface adjoining said side clearance surface and intersecting said rake face in a wiping edge at the bottom of said main cutting edge;

said main cutting edge being blunted by a land which increases progressively in width upwardly along the depth of cut from a minimum at the bottom of said cutting edge to a maximum where said cutting edge meets said outer skin.

12. The method of claim 11 wherein said cutting edge land is a warped surface which is raked radially positive at the bottom of said cutting edge and progressively less positive upwardly along said cutting edge.

13. The method of claim 12 wherein the radial rake of said cutting edge land is negative where the cutting edge meets said outer skin.

* * * * *